(12) United States Patent
Nojima et al.

(10) Patent No.: US 11,305,171 B2
(45) Date of Patent: Apr. 19, 2022

(54) MOTION EVALUATION DEVICE USING ANGULAR SPEED MEASURED BY A WEARABLE SENSOR

(71) Applicant: CASIO COMPUTER CO., LTD., Tokyo (JP)

(72) Inventors: Osamu Nojima, Tokyo (JP); Ryuji Kobayashi, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 680 days.

(21) Appl. No.: 16/194,182

(22) Filed: Nov. 16, 2018

(65) Prior Publication Data

US 2019/0151737 A1 May 23, 2019

(30) Foreign Application Priority Data

Nov. 20, 2017 (JP) .............................. JP2017-222983

(51) Int. Cl.
 *A63B 69/36* (2006.01)
 *G09B 19/00* (2006.01)
 *G06V 40/20* (2022.01)

(52) U.S. Cl.
 CPC ...... *A63B 69/3623* (2013.01); *G09B 19/0038* (2013.01); *A63B 2220/805* (2013.01); *G06V 40/23* (2022.01)

(58) Field of Classification Search
 CPC ............ A63B 69/3623; G09B 19/0038; G06K 9/00342; G06K 9/0053
 See application file for complete search history.

(56) References Cited

U.S. PATENT DOCUMENTS

| 2014/0018181 A1* | 1/2014 | Blake ..................... G16H 20/30 473/277 |
| 2014/0228141 A1* | 8/2014 | Sakyo ................ A63B 24/0006 473/223 |
| 2018/0360383 A1 | 12/2018 | Ishikura et al. |

FOREIGN PATENT DOCUMENTS

| JP | 2009050721 A | 3/2009 |
| JP | 2009279126 A | 12/2009 |
| JP | 2010068947 A | 4/2010 |
| WO | 2017119403 A1 | 7/2017 |

OTHER PUBLICATIONS

Japanese Office Action (and English language translation thereof) dated Jul. 14, 2020 issued in Japanese Application No. 2017-222983.

* cited by examiner

*Primary Examiner* — Nathaniel J Kolb
(74) *Attorney, Agent, or Firm* — Holtz, Holtz & Volek PC

(57) ABSTRACT

To appropriately determine whether or not a motion of a user is good in an electronic device that detects the motion of the user by a sensor installed on a lower back portion. An analysis system S includes a sensor unit 1 and a processing device 2. The sensor unit 1 is installed on a lower back portion of a user. The processing device 2 includes a swing evaluating section 254. The swing evaluating section 254 extracts a first peak waveform and a second peak waveform in an output result of an angular speed measured by a sensor installed on the lower back portion of the user. The swing evaluating section 254 evaluates the motion of the user on the basis of an extraction result.

9 Claims, 15 Drawing Sheets

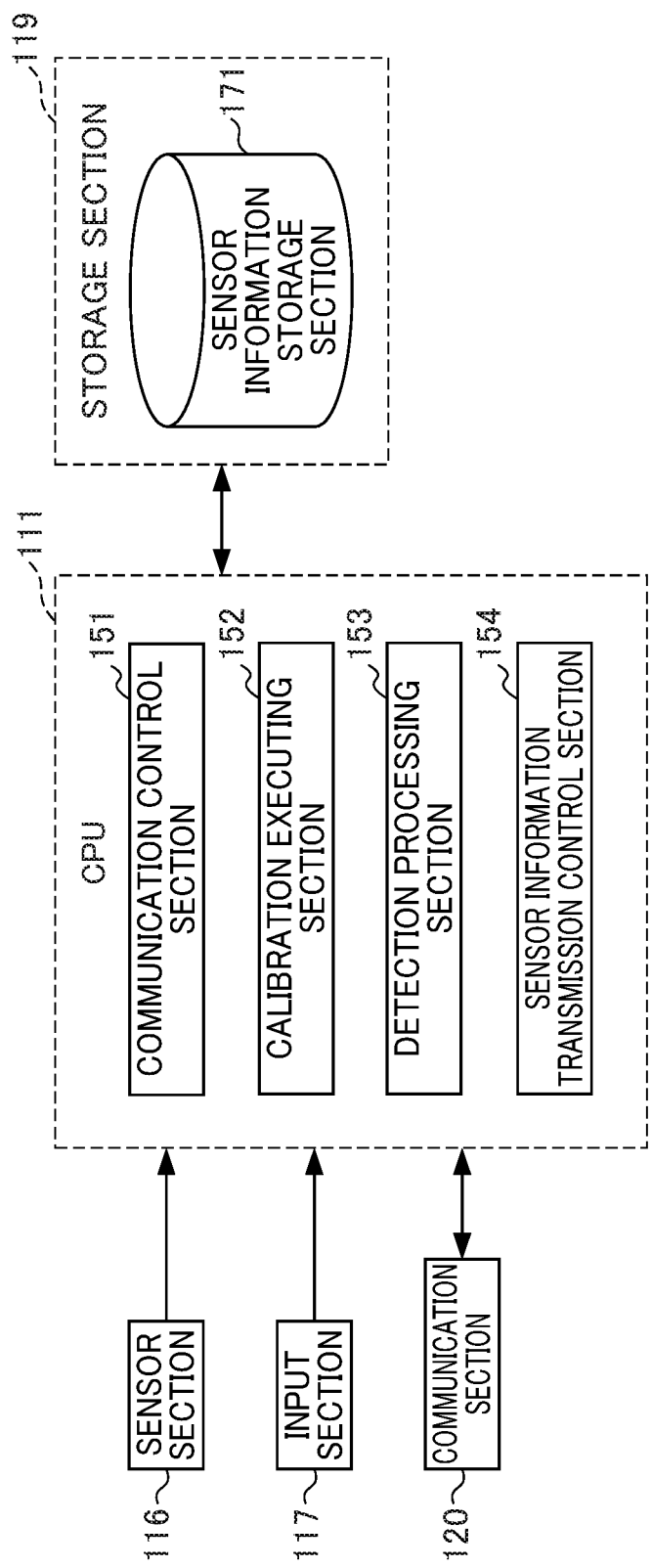

FIG. 8

| | ROTATION ANGLE ACCELERATION | AVERAGE CARRY | MAXIMUM ANGULAR SPEED | AVERAGE ANGLE ACCELERATION (TOP TO MAXIMUM) | ANGULAR ROTATION AT MAXIMUM SPEED | TOP ROTATION ANGLE | RIGHT-LEFT MOVEMENT AMOUNT (TOP TO 0°) | UP-DOWN MOVEMENT AMOUNT (TOP TO 0°) |
|---|---|---|---|---|---|---|---|---|
| PROFESSIONAL P1 | | 289 | 509 | 2140 | 7.3 | −54.7 | 5.9 | −0.8 |
| PROFESSIONAL P2 | | 284 | 616 | 3071 | 0.2 | −55.4 | −1.1 | −0.8 |
| PROFESSIONAL P3 | | 281 | 542 | 2165 | −20.1 | −72.2 | −2.4 | −1.3 |
| PROFESSIONAL P4 | | 277 | 571 | 2484 | −9 | −64.6 | 2.2 | −4.4 |
| PROFESSIONAL P5 | | 273 | 651 | 3288 | −2 | −66.5 | −5.5 | 0.6 |
| PROFESSIONAL P6 | | 264 | 491 | 3113 | −18.6 | −58.5 | −2.5 | −0.2 |
| PROFESSIONAL P7 | | 264 | 505 | 2424 | −9.5 | −56.2 | −6.3 | 1.3 |

FIG. 9

| | ROTATION ANGLE ACCELERATION | AVERAGE CARRY | MAXIMUM ANGULAR SPEED | AVERAGE ANGLE ACCELERATION (TOP TO MAXIMUM) | ANGULAR ROTATION AT MAXIMUM SPEED | TOP ROTATION ANGLE | RIGHT-LEFT MOVEMENT AMOUNT (TOP TO 0°) | UP-DOWN MOVEMENT AMOUNT (TOP TO 0°) |
|---|---|---|---|---|---|---|---|---|
| AMATEUR A1 | | — | 511 | 1487 | 0.3 | −76.6 | 3.6 | 2.9 |
| AMATEUR A2 | | — | 517 | 1949 | −1.4 | −73.7 | 5.4 | 2.4 |
| AMATEUR A3 | | 183 | 440 | 1541 | −8.2 | −67.4 | 3.8 | 4.5 |
| AMATEUR A4 | | 225 | 471 | 1851 | −5.8 | −65.9 | 2.4 | 1.5 |
| AMATEUR A5 | | 240 | 534 | 1817 | 7.5 | −54.0 | 1.7 | 2.7 |
| AMATEUR A6 | | 167 | 496 | 1250 | −7.6 | −77.3 | 8.9 | 1.1 |
| AMATEUR A7 | | 205 | 532 | 1756 | −22.6 | −72.9 | 1.9 | −1.7 |

FIG. 14

| ITEMS | | POINTS | INDICATOR A | INDICATOR B | INDICATOR C | INDICATOR D | INDICATOR E | AVERAGE | DEVIATION |
|---|---|---|---|---|---|---|---|---|---|
| RIGHT AND LEFT | | ADDRESS TO TOP | LESS THAN x1 | x1~x2 | x2~x3 | x3~x4 | x4 OR MORE | 6.7 | 4.1 |
| | | TOP TO FRONT | LESS THAN y1 | y1~y2 | y2~y3 | y3~y4 | y4 OR MORE | -0.6 | 4.8 |
| | | FRONT TO FINISH | LESS THAN z1 | z1~z2 | z2~z3 | z3~z4 | z4 OR MORE | -3.2 | 5.8 |
| UP AND DOWN | | ADDRESS TO TOP | LESS THAN x5 | x5~x6 | x6~x7 | x7~x8 | x8 OR MORE | -1.6 | 1.9 |
| | | TOP TO FRONT | LESS THAN y5 | y5~y6 | y6~y7 | y7~y8 | y8 OR MORE | 0.9 | 2.1 |
| | | FRONT TO FINISH | LESS THAN z5 | z5~z6 | z6~z7 | z7~z8 | z8 OR MORE | 0.2 | 3.6 |
| FRONT AND REAR | | ADDRESS TO TOP | LESS THAN x9 | x9~x10 | x10~x11 | x11~x12 | x12 OR MORE | -4.1 | 4.3 |
| | | TOP TO FRONT | LESS THAN y9 | y9~y10 | y10~y11 | y11~y12 | y12 OR MORE | 8.5 | 3.9 |
| | | FRONT TO FINISH | LESS THAN z9 | z9~z10 | z10~z11 | z11~z12 | z12 OR MORE | -7.9 | 4.7 |

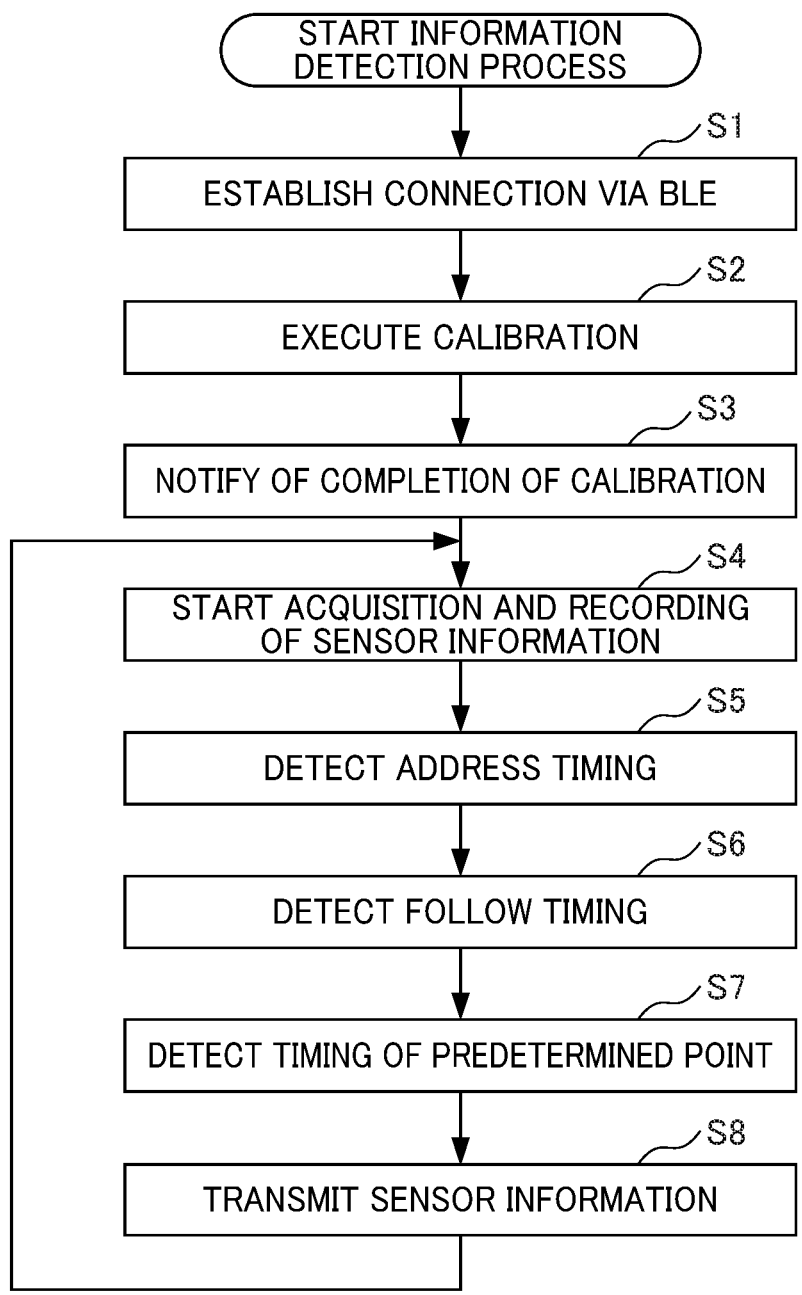

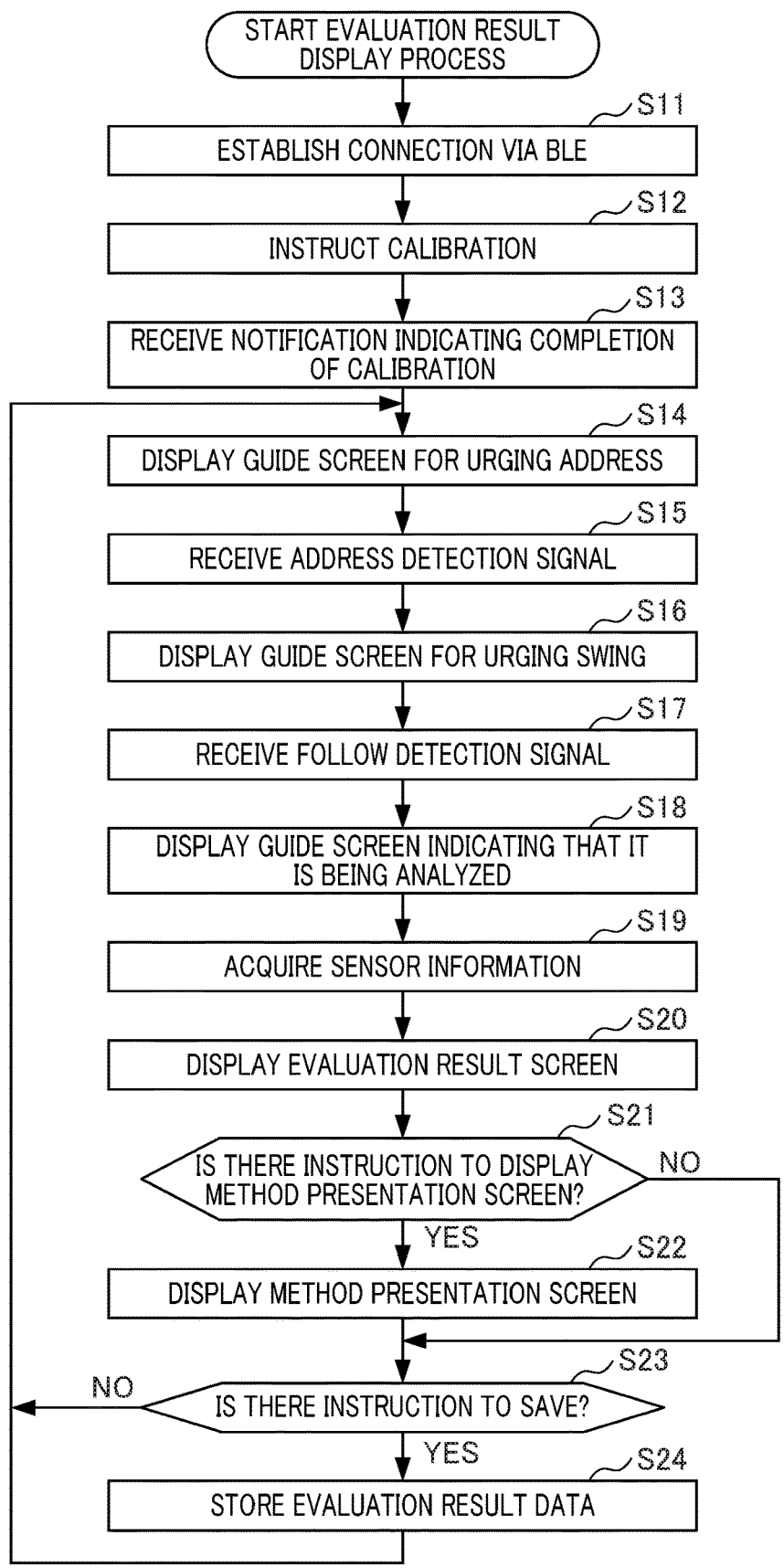

MOTION EVALUATION DEVICE USING ANGULAR SPEED MEASURED BY A WEARABLE SENSOR

CROSS-REFERENCE TO RELATED APPLICATIONS

This application is based upon and claims the benefit of priority under 35 USC 119 of Japanese Patent Application No. 2017-222983 filed on Nov. 20, 2017 the entire disclosure of which, including the description, claims, drawings, and abstract, is incorporated herein by reference in its entirety.

BACKGROUND OF THE INVENTION

Field of the Invention

The present invention relates to an electronic device, an evaluation method, and a storage medium having a program stored therein.

Related Art

In recent years, various techniques for analyzing movement of a subject are under review for the purpose of improving sports skills or the like. For example, a configuration of extracting a first vertex and a second vertex from a detection result of an angular speed meter installed on a lower back portion and specifying a predetermined element of a swing on the basis of an extraction result in a device that measures a golf swing is disclosed in JP 2010-68947 A.

SUMMARY OF THE INVENTION

One aspect of the embodiment is an electronic device comprising: a memory; and a processor, wherein the processor executes a program stored in the memory to perform operations comprising:extracting a series of first peak waveform and second peak waveform included in an output result of an angular speed measured by a sensor installed on a lower back portion of a user; and evaluating a motion of the user on the basis of a result of the extraction

BRIEF DESCRIPTION OF THE DRAWINGS

FIG. 5 is a functional block diagram illustrating a functional configuration for executing an information detection process in a functional configuration of a sensor unit.

FIG. 8 is a schematic diagram illustrating an example of swing data of advanced-level persons in golf.

FIG. 9 is a schematic diagram illustrating an example of swing data of beginners and intermediate-level persons in golf.

FIG. 14 is a schematic diagram illustrating a relation between an indicator and a deviation.

FIG. 15 is a flowchart for describing a flow of an information detection process executed by a sensor unit.

FIG. 16 is a flowchart for describing a flow of an evaluation result display process executed by a processing device.

DETAILED DESCRIPTION OF THE INVENTION

Hereinafter, an exemplary embodiment of the present invention will be described with reference to the appended drawings.

System Configuration

Figure 1:
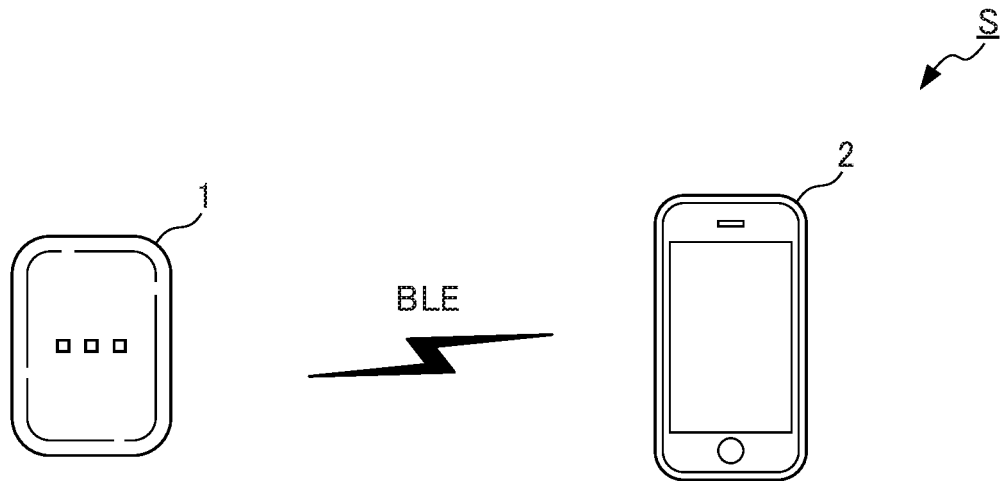
FIG. 1 is a system configuration diagram illustrating a configuration of an analysis system according to an embodiment of the present invention.

FIG. 1 is a system configuration diagram illustrating a configuration of an analysis system S according to an embodiment of the present invention. Further, FIG. 2 is a schematic diagram illustrating an example of a usage form of the analysis system S.

Figure 2:
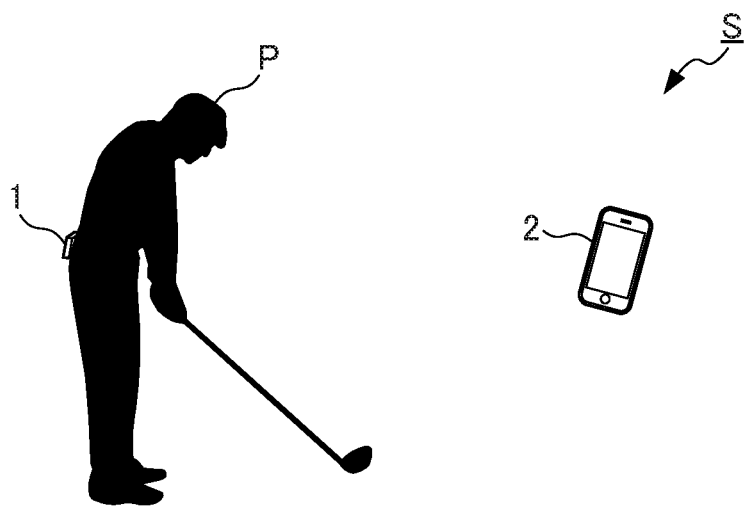
FIG. 2 is a schematic diagram illustrating an example of a usage form of an analysis system.

As illustrated in FIGS. 1 and 2, the analysis system S includes a sensor unit 1 and a processing device 2. Further, the sensor unit 1 and the processing device 2 are configured to perform communication in accordance with Bluetooth (registered trademark) low energy/Bluetooth LE (hereinafter referred to as "BLE").

The sensor unit 1 is installed on a measurement subject and senses a motion of the measurement subject and transmits sensor information to the processing device 2. In the present embodiment, the sensor unit 1 is installed on a lower back or the like of a person who performs a golf swing motion (hereinafter referred to as a "measurement subject P") and senses the motion.

The processing device 2 analyzes the sensor information acquired from the sensor unit 1 installed on the measurement subject and displays a result of evaluating the motion of the measurement subject. For example, the processing device 2 displays a display screen of an evaluation result indicating a rotating speed of the lower back of the measurement subject, an angle of the lower back, a movement amount of the lower back, a swing rhythm, and comprehensive evaluation for each golf swing performed by the measurement subject.

Hardware Configuration

Figure 3:
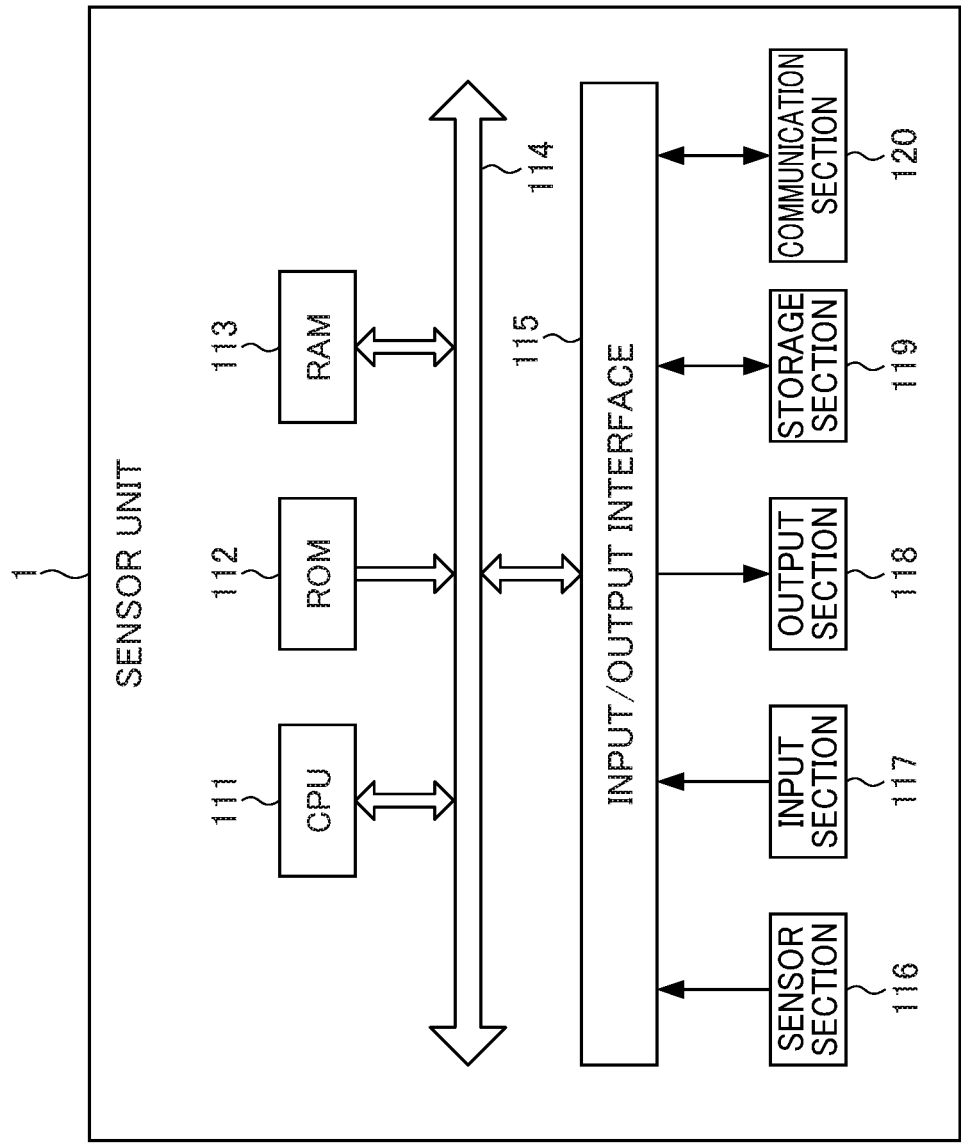
FIG. 3 a block diagram illustrating a hardware configuration of a sensor unit.

FIG. 3 is a block diagram illustrating a hardware configuration of the sensor unit 1.

The sensor unit 1 is configured as a device including various kinds of sensors that detect the motion of the measurement subject.

As illustrated in FIG. 3, the sensor unit 1 includes a central processing unit (CPU) 111, a read only memory (ROM) 112, a random access memory (RAM) 113, a bus 114, an input/output interface 115, a sensor unit 116, an input unit 117, an output unit 118, a storage unit 119, and a communication unit 120. The sensor unit 1 may be configured so that a removable medium made of a semiconductor memory or the like can be mounted therein.

The CPU 111 executes various processings according to a program recorded in the ROM 112, or a program loaded in the RAM 113 from the storage unit 119.

Data or the like necessary for the CPU 727 to execute various processings, is also suitably stored in the RAM 113.

The CPU 111, the ROM 112, and the RAN 113 are connected to each other through the bus 114. In addition, the input/output interface 115 is also connected to the bus 114. The sensor unit 116, the input unit 117, the output unit. 118, the storage unit 119, and the communication unit 120 are connected to the input/output interface 115.

The sensor section 116 includes a triaxial acceleration sensor that measures triaxial-direction acceleration, a triaxial angular speed sensor that measures a triaxial-direction angular speed, and a triaxial geomagnetism sensor that measures triaxial-direction geomagnetism. The sensor section 116 measures the triaxial-direction acceleration, angular speed, and geomagnetism through the triaxial acceleration sensor, the triaxial angular speed sensor, and the triaxial geomagnetism sensor at intervals of a preset sampling period (for example, 0.001 seconds). Data of the acceleration and the angular speed measured by the sensor section 116 which is associated with data of a measurement time is stored in the storage section 119 or transmitted to the processing device 2.

The input section 117 includes various kinds of buttons or the like, and receives various kinds of information in accordance with an instruction manipulation of the user.

The output section 118 includes a lamp, a speaker, a vibration motor, or the like, and outputs light, a sound, or a vibration signal.

The storage section 119 includes a semiconductor memory such as a dynamic random access memory (DRAM) and stores various kinds of data.

The communication section 120 controls communication with other devices via direct wireless communication between the terminals in the present embodiment, the communication section 120 communicates with the processing device 2 via BLE (registered trademark).

Figure 4:
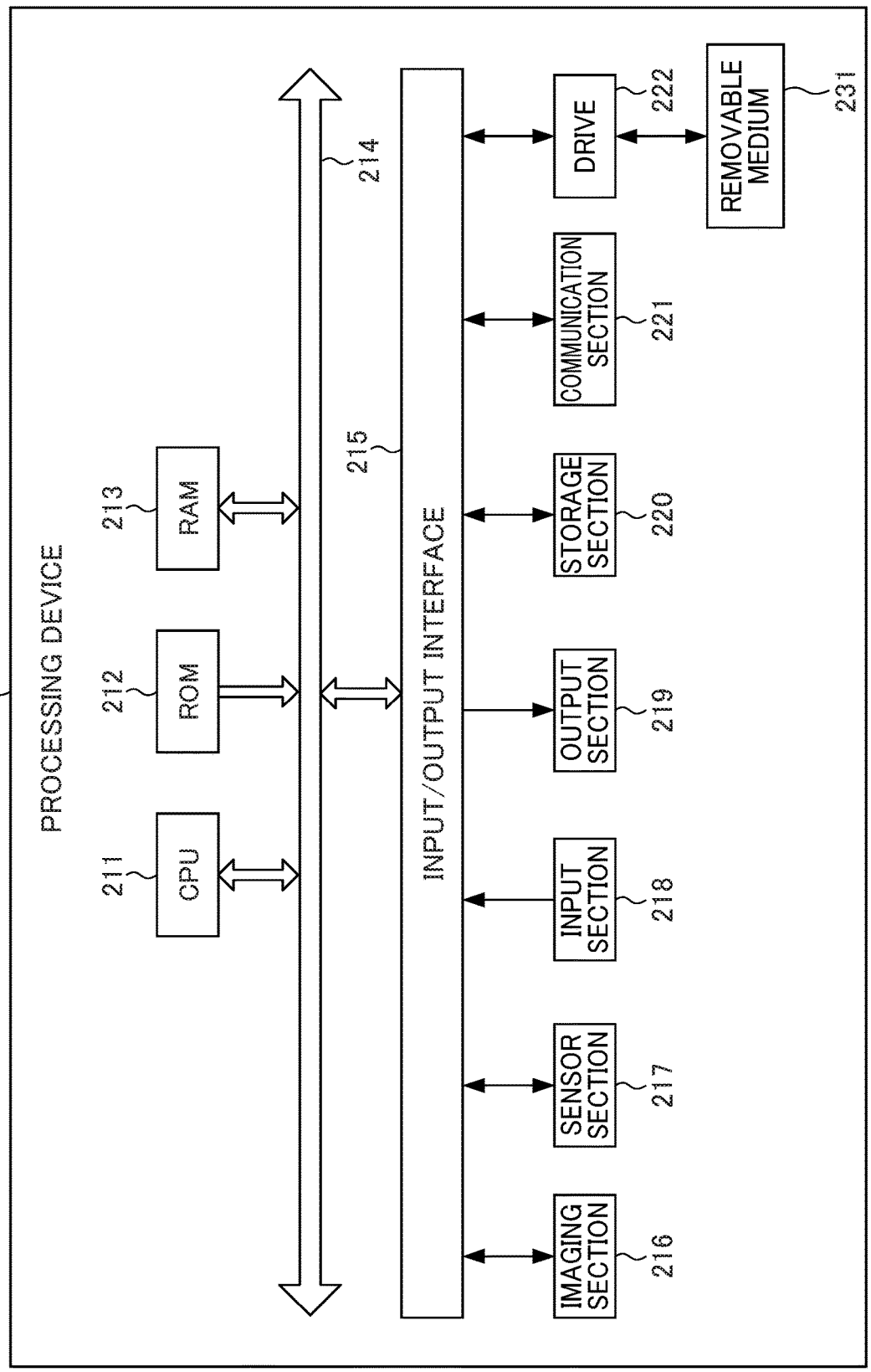
FIG. 4 is a block diagram illustrating a hardware configuration of a processing device.

FIG. 4 is a block diagram illustrating a hardware configuration of the processing device 2.

The processing device 2 is an information processing device having an information display function, and is configured as, for example, a smartphone.

As illustrated in FIG. 4, the processing device 2 includes a CPU 211, a ROM 212, a RAM 213, a bus 214, an input/output interface 215, an imaging section 216, a sensor section 217, an input section 218, an output section 219, a storage section 220, a communication section 221, and a drive 222. A removable medium 231 including a magnetic disk, an optical disk, a magneto-optical disk, a semiconductor memory, or the like is appropriately loaded onto the drive 222.

Among them, configurations other than the imaging section 216, the input section 218, the output section 219, and the communication section 221 are similar to the corresponding sections of FIG. 3.

Although not illustrated, the imaging section 216 includes an optical lens unit and an image sensor.

The optical lens unit includes a lens such as, for example, a focus lens, a zoom lens, or the like that collects light in order to photograph a subject.

The focus lens is a lens that forms a subject image on a light receiving surface of the image sensor. The zoom lens is a lens that causes a focal length to be freely changed within a certain range.

Further, a peripheral circuit for adjusting setting parameters such as focus, exposure, white balance, and the like installed in the imaging section 216 if necessary.

The image sensor is configured of a photoelectric conversion element, an analog front end (AFE), or the like.

The photoelectric conversion element, for example, is configured of a complementary metal oxide semiconductor (CMOS) type photoelectric conversion element or the like. The subject image is incident on the photoelectric conversion element from the optical lens unit. Then, the photoelectric conversion element performs photoelectric conversion (imaging) with respect to the subject image, accumulates an image signal for a constant time, and sequentially supplies the accumulated image signals to the AFE, as an analog signal.

The AFE executes various signal processings such as analog/digital (A/D) conversion processing, with respect to the analog image signal. A digital signal is generated by the various signal processings, and is output as an output signal from the imaging section 216.

Such output signal from the imaging section 216 will be referred to as "imaged picture data". Imaged picture data is suitably supplied to the CPU 211 and the like. A The input unit 218 is configured of various buttons, a touch panel, or the like, and inputs various information items according to an instruction and an operation of the user.

The output unit 219 is configured of a display, a speaker, or the like, and outputs an image or a sound.

The communication section 221 controls communication with other devices (not illustrated) via a network including the Internet. The communication section 221 also controls communication with other devices via direct wireless communication between terminals. In the present embodiment, the communication section 221 communicates with the sensor unit 1 via BLE (registered trademark).

Functional Configuration

FIG. 5 is a functional block diagram illustrating a functional configuration for executing an information detection process in a functional configuration of the sensor unit 1.

The information detection process includes a series of processings in which the sensor unit 1 installed on the measurement subject senses the motion of the measurement subject when the analysis system S analyzes the motion of the measurement subject.

When the information detection process is executed, a communication control section 151, a calibration executing section 152, a detection processing section 153, and a sensor information transmission control section 154 function in the CPU 111 as illustrated in FIG. 5.

A sensor information storage section 171 is set in a region of the storage section 119.

The sensor information acquired by the sensor unit 1 is stored in the sensor information storage section 171 in association with an acquisition time.

The communication control section 151 controls communication of the sensor unit 1 via the BLE and executes a pairing process with other devices or a data transmission/reception process.

In accordance with an instruction from the processing device 2, the calibration executing section 152 acquires sensor information in a reference state and executes calibration in which an acquisition result is set as a reference value in the present embodiment, the calibration executing section. 152 sets a state in which the sensor unit 1 is installed on the lower back of the measurement subject P, and a posture addressed to a position for performing a golf swing is taken as a reference, and sets sensor information acquired in this state as a reference value.

Figure 6A:
FIG. 6A is a schematic diagram illustrating an installation state of a sensor unit.
Figure 6B:
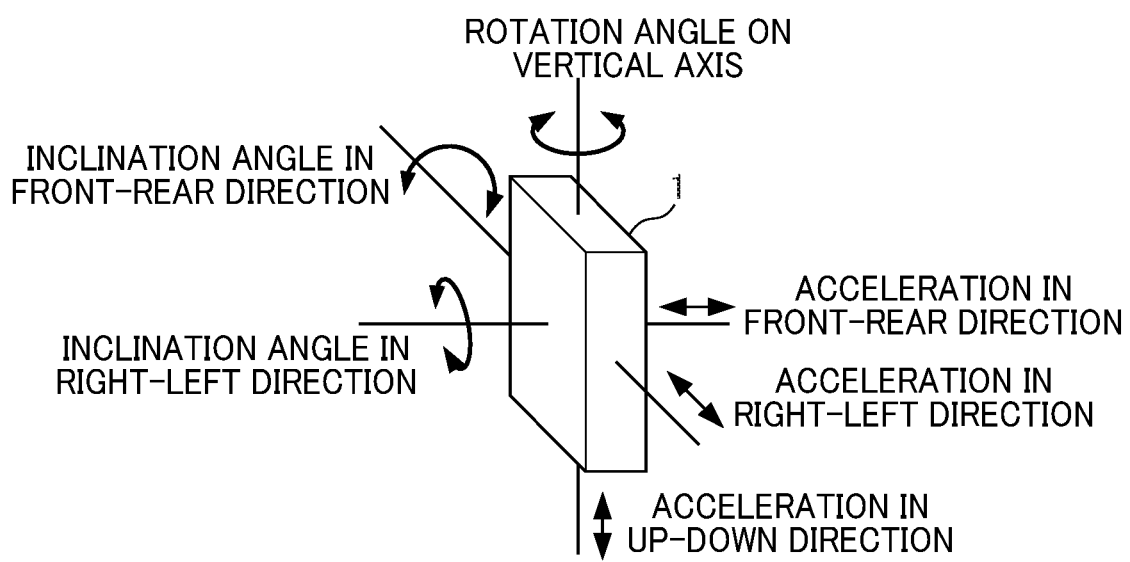
FIG. 6B is a schematic diagram illustrating an example of information detected by a sensor unit.

FIG. 6A is a schematic diagram illustrating an installation state of the sensor unit 1, and FIG. 6B is a schematic diagram illustrating an example of information detected by the sensor unit 1. In the following description, in each axis set to the sensor unit 1, a forward direction of the measurement subject P for rotation in a front-rear direction is referred to as plus, a follow direction of the measurement subject P for rotation on a vertical axis is referred to as plus, and a direction in which a lower back of the measurement subject P on a follow side is high for rotation in a right-left direction is referred to as plus. A front direction of the measurement subject P for parallel movement in the front-rear direction is referred to as plus, an upward direction of the measurement subject P for parallel movement in an up-down direction is referred to as plus, and a follow direction of the measurement subject P for parallel movement in the right-left direction is referred to as plus.

When calibration is performed, as illustrated in FIG. 6A, for example, the sensor unit 1 is installed on the lower back of the measurement subject P by a belt or the like, the measurement subject P stands still with an address posture facing a ball at a position for performing a golf swinging for a predetermined period of time (for example, two seconds).

At this time, as illustrated in FIG. 6B, the sensor unit 1 acquires sensor information (an inclination angle of the body in the front-rear direction, an inclination angle in the right-left direction, and a rotation angle on the vertical axis) on the basis of a gravity direction detected by the triaxial acceleration sensor and an azimuth direction detected by the triaxial geomagnetism sensor, and sets each piece of acquired sensor information as a reference value at address. Thereafter, when the measurement subject P performs a swing, if each piece of sensor information detected in the sensor unit 1 falls within a range of a threshold value set with regard to each piece of sensor information for the reference value at address for a predetermined period of time or more (for example, two seconds), it is detected as an address state.

Further, since the triaxial acceleration sensor is installed, the sensor unit 1 can also detect movement (parallel movement, or the like) of the sensor unit 1, and since the triaxial geomagnetism sensor is installed, the sensor unit 1 can also detect an azimuth direction in which the sensor unit 1 faces.

Further, when the calibration executing section 152 executes the calibration, the reference value may be acquired in a state in which the measurement subject P stands upright.

For example, the sensor unit s installed on the lower back of the measurement subject P a belt or the like, the measurement subject P stands still with an upright posture facing a ball at a position for performing a golf swinging for a predetermined period of time (for example, two seconds). At this time, the sensor unit 1 acquires sensor information (an inclination angle of the body in the front-rear direction, an inclination angle in the right-left direction, and a rotation angle on the vertical axis) on the basis of a gravity direction detected by the triaxial acceleration sensor and an azimuth direction detected by the triaxial geomagnetism sensor, and sets each piece of acquired sensor information as a reference value in an upright posture. Thereafter, when the measurement subject P performs a swing, if each piece of sensor information detected in the sensor unit 1 falls within a range of a threshold value corresponding to the posture at address set with regard to each piece of sensor information for the reference value in the upright posture for a predetermined period of time or more (for example, two seconds), it is detected as an address state.

The detection processing section 153 sequentially acquires various kinds of sensor information and stores the acquired sensor information in association with an acquisition time in the sensor information storage section 171. The sensor information stored in the sensor information storage section 171 may be sequentially discarded when a predetermined period of time elapses from the acquisition time. Here, the sensor information acquired from the address for the golf swing to the end of the swing is discarded after at least transmission to the processing device 2 is completed.

Further, the detection processing section 153 detects a timing of a predetermined feature point in the golf swing on the basis of the acquired sensor information. For example, the detection processing section 153 analyzes a waveform of the acquired sensor information, and detects timings of respective points of address, top, down swing, impact, and follow in the golf swing.

As described above, in addition to the timings of the respective points in the golf swing, period corresponding to the respective points may be directly detected.

Further, when the address timing and the following timing are detected, the detection processing section 153 sequentially transmits a signal indicating that the address timing is detected (hereinafter referred to as an "address detection signal") and a signal indicating that the follow timing is detected (hereinafter referred to as a "follow detection signal") to the processing device 2 via the BLE.

The sensor information transmission control section 154 performs control such that the sensor information acquired by the detection processing section 153 is transmitted to the processing device 2. In the present embodiment, the detection processing section 153 can acquire the sensor information of about 1,000 samples/sec. Then, the sensor information transmission control section 154 converts the sensor information acquired by the detection processing section 153 into a preset sampling rate (for example, about 240 samples/sec) and transmits the sampling rate to the processing device 2. In the present embodiment, the sensor information in the range from the address to the follow in the golf swing of the measurement subject P is transmitted to processing device 2.

Further, when the sensor information is transmitted to the processing device 2, the sensor information transmission control section 154 transmits the timings of the respective points of the address, the top, the down swing, the impact, and the follow (the feature points in the golf swing) detected by the detection processing section 153 to the processing device 2 together.

In the present embodiment, the sensor information acquired by the detection processing section 153 is converted into a waveform in which influence of noise is suppressed by filtering output signals of various kinds of sensors, and the sensor information transmission control section 154 transmits the sensor information to the processing device 2, the sensor information being obtained from the waveform indicated by the sensor information of a processing result.

Accordingly, the motion of the measurement subject P can be evaluated with reference to information with higher reliability than the sensor information with a large variation due to the influence of noise.

Next, a functional configuration of the processing device 2 will be described.

Figure 7:
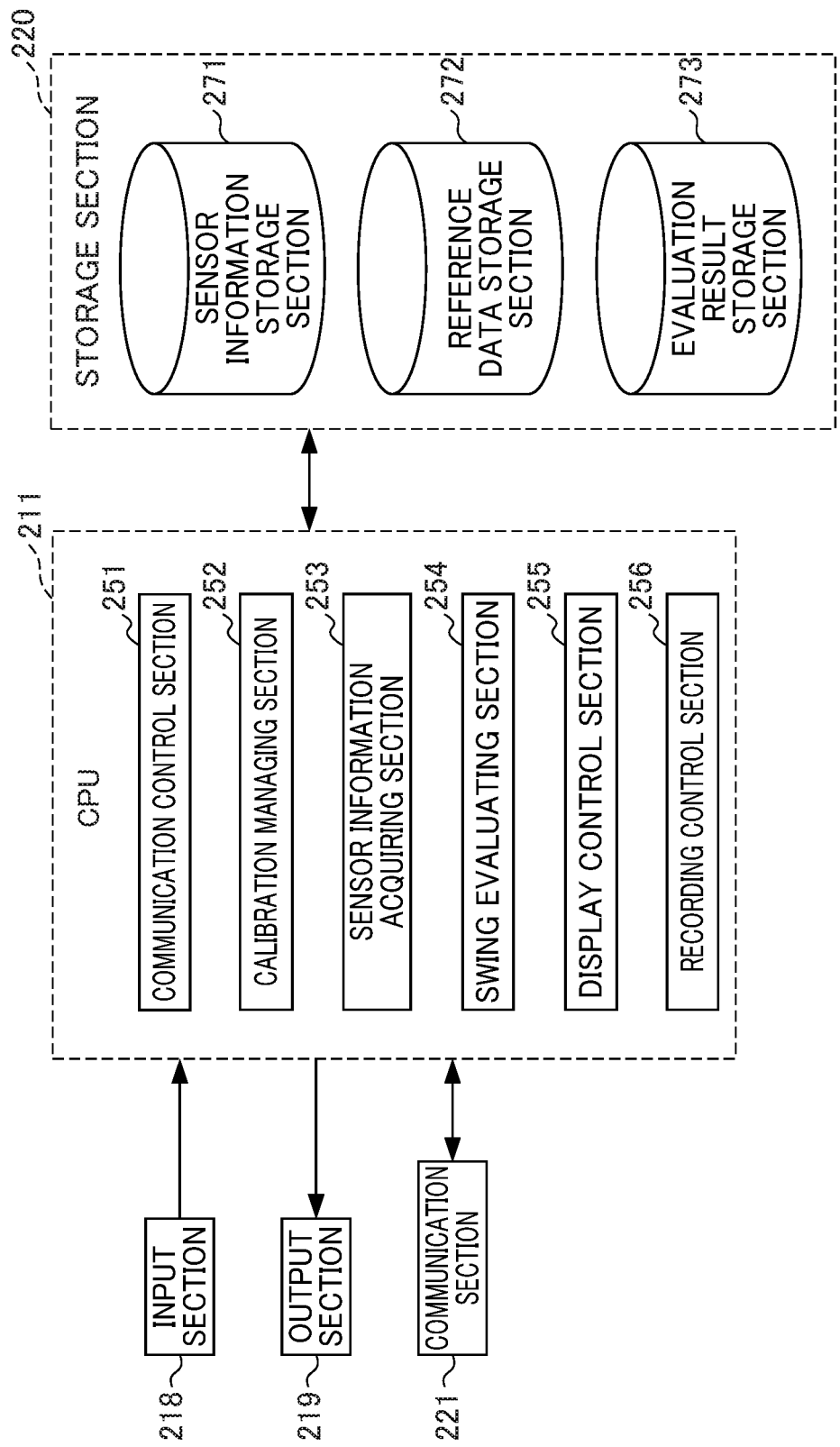
FIG. 7 is a functional block diagram illustrating a functional configuration for executing an evaluation result display process in a functional configuration of a processing device.

FIG. 7 is a functional block diagram illustrating a functional configuration for executing an evaluation result display process in a functional configuration of the processing device 2.

The evaluation result display process includes a series of processings of analyzing the sensor information detected by the sensor unit 1, acquiring features in the golf swing of the measurement subject. P (the rotating speed of the lower back, the angle of the lower back, a movement amount of the lower back, the swing rhythm, the comprehensive evaluation, or the like), and displaying the acquired features as a swing evaluation results of the measurement subject P using a numerical value and a diagram.

When the evaluation result display process is executed, a communication control section 251, a calibration managing section 252, a sensor information acquiring section 253, a swing evaluating section 254, a display control section 255, and a recording control section 256 function in the CPU 211 as illustrated in FIG. 7.

A sensor information storage section 271, a reference data storage section 272, and an evaluation result storage section 273 are set in a region of the storage section 220.

The sensor information of each swing transmitted from the sensor unit 1 is stored in the sensor information storage section 271, in association with a time at which the sensor information is acquired.

Data to be referred to as a reference when a swing is evaluated such as statistical data (an average value or the like) related to a swing of an advanced-level person in golf or data of a good swing of the measurement subject P is stored in the reference data storage section 272.

FIG. 8 is a schematic diagram illustrating an example of swing data of advanced-level persons (professional golfers P1 to P7) in golf. FIG. 9 is a schematic diagram illustrating an example of swing data of beginners and intermediate-level persons (amateurs A1 to A7) in golf.

As illustrated in FIG. 8, the swings of the advanced-level persons in golf have a tendency that two big mountains appear in the waveform of the rotation angle acceleration of the lower back. This means that, in the case of the advanced-level person, the rotation of the lower back is stopped once during the swing, and this motion makes it easy to increase the rotating speed of the lower back. Further, referring to FIGS. 8 and 9, a maximum angular speed of the rotation of the lower back is 530 [°/sec] on average in the case of the advanced-level person in golf (the professional golfer), whereas the maximum angular speed of the rotation of the lower back is 400 [°/sec] on average in the case of the beginner and the intermediate-level person in golf (amateurs). Further, an average angle acceleration until the highest rotating speed of the lower back is reached from the top posture is 2500 [°/(sec)$^2$] on average in the case of the advanced-level person in golf, whereas the average angle acceleration until the highest rotating speed of the lower back is reached from the top posture is 1700 [°/(sec)$^2$] on average in the case of the beginner and the intermediate-level person in golf. Further, the rotation angle of the lower back in top posture is −60 [°] on average in the case of the advanced-level person in golf, whereas the rotation angle of the lower back in top posture is −70 [°] on average in the case of the beginner and the intermediate-level person in golf. From such a tendency, it can be determined that a big difference lies in that in the case of the beginners and the intermediate-level persons in golf, as compared with the advanced-level persons, particularly the rotation angle acceleration of the lower back is small, and it takes time to reach the highest rotating speed. In other words, when the advanced-level persons in golf are compared with the beginners and the intermediate-level persons, a big difference lies in how to use the lower back, and the beginners and the intermediate-level persons can improve the golf swing by improving how to use the lower back.

Returning to FIG. 7, the evaluation result storage section 273 stores information related to the evaluation result of the measurement subject P generated in the evaluation result display process.

The communication control section 251 controls communication of the processing device 2 via the BLE and executes the pairing process with other devices or the data transmission/reception process. In the present embodiment, when the communication via the BLE is performed, the processing device 2 functions as a master, and other devices function as a slave.

The calibration managing section 252 instructs the sensor unit 1 to execute the calibration.

In the present embodiment, the calibration in the sensor unit 1 is executed once when the evaluation result display process is executed.

The sensor information acquiring section 253 acquires the sensor information of the preset sampling rate from the sensor unit 1 via the BLE. In the present embodiment, the sensor information acquiring section 253 acquires the sensor information in the range from the address to the follow in the golf swing of measurement subject P from the sensor unit 1. Information identifying the respective points of the address, the top, the down swing, the impact, and the follow is added to the sensor information acquired at this time.

The swing evaluating section 254 analyzes various kinds of sensor information acquired from the sensor unit 1 and acquires data (hereinafter referred to as "evaluation result data") indicating the features in the golf swing of the measurement subject P (the rotating speed of the lower back of the measurement subject, the angle of the lower back, the movement amount of the lower back, the swing rhythm, the comprehensive evaluation, and the like).

At this time, the swing evaluating section 254 calculates the movement amount (distance) by integrating the detection value of the triaxial acceleration sensor, calculates the rotation angle acceleration by differentiating the detection value of the triaxial angular speed sensor, and calculates the rotation angle by integrating the detection value of the triaxial angular speed sensor.

In the present embodiment, the swing evaluating section 254 can acquire various data related to the swing that can be acquired from the sensor information and use necessary data among them as the evaluation result data of the swing.

The display control section 255 displays a guide screen for measuring the swing of the measurement subject P. The guide screen includes a message for urging a motion such as "please address" and "please swing," and a message for informing of a situation such as "swing is being analyzed."

Further, the display control section 255 displays a screen (hereinafter referred to as an "evaluation result display screen") indicating the evaluation result of the swing of the measurement subject P on the basis of the evaluation result data acquired by the swing evaluating section 254. When the evaluation result display screen is displayed, buttons for displaying the rotating speed of the lower back of the measurement subject, the angle of the lower back, the movement amount of the lower back, the swing rhythm, and the comprehensive evaluation are displayed on a menu screen. Then, if the user manipulates one of the buttons, the evaluation result display screen for displaying the respective features is displayed.

Figure 10:
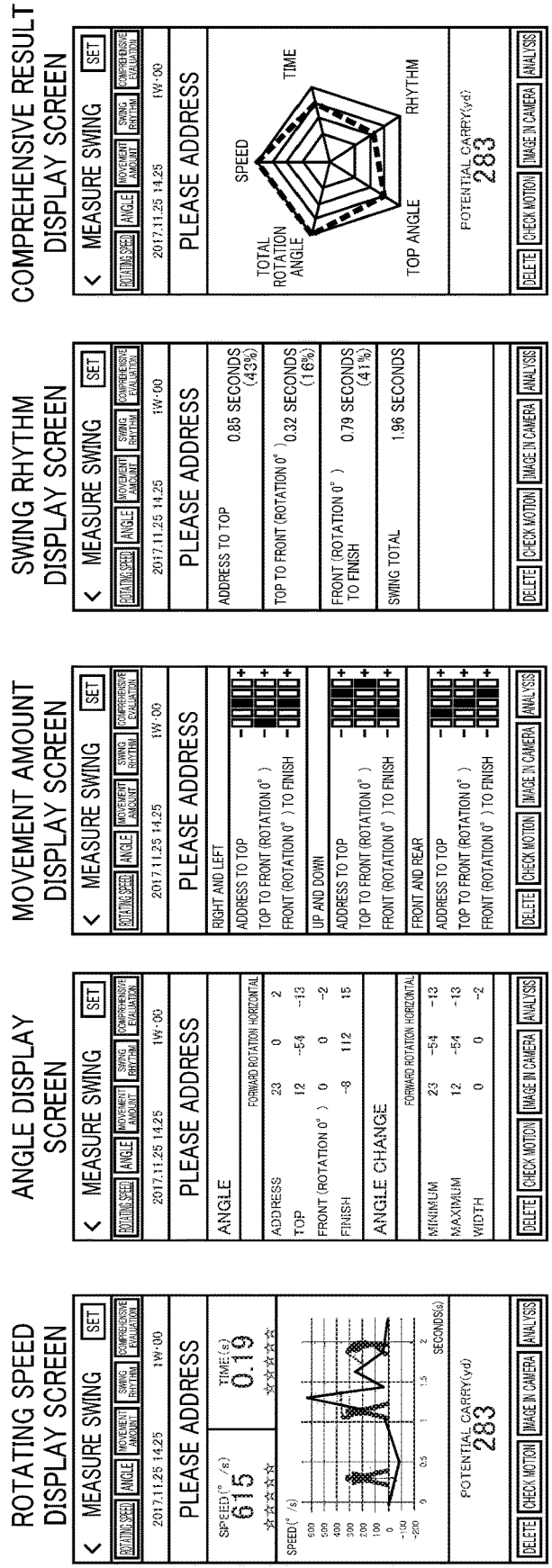
FIG. 10 is a schematic diagram illustrating an example of an evaluation result display screen.

FIG. 10 is a schematic diagram illustrating an example of the evaluation result display screen.

As illustrated in FIG. 10, a rotating speed display screen for displaying features related to the rotating speed of the lower back, an angle display screen for displaying features related to the angle of the lower back, a movement amount display screen for displaying features related to the movement amount of the lower back, a swing rhythm display screen for displaying features related to the swing rhythm, and a comprehensive evaluation display screen for displaying features related to the comprehensive evaluation are selectable as the evaluation result display screen.

The rotating speed display screen is a display screen including numerical values indicating the rotating speed (rotation angle speed) of the lower back and a time to reach the highest rotating speed of the lower back from the top posture, a graph indicating a time change in the rotating speed of the lower back, and the like.

The angle display screen is a display screen including numerical values indicating a forward angle, a rotation angle, and a horizontal angle at each point in the swing, and a maximum value, a minimum value, and a variation width thereof.

The movement amount display screen is a display screen including an indicator indicating the magnitude (movement degree) of the movement amount in the up-down direction, the right-left direction, and the front-rear direction between the points in the swing, and the like. In the present embodiment, the indicator in the movement amount display screen indicates that a deviation of the swing of the measurement subject P with respect to statistical data based on an average of the swings of a predetermined number or more of advanced-level persons (male and female professional golfers or the like) in a stepwise manner.

The swing rhythm display screen is a display screen including a numerical value or the like indicating an elapsed time of each point in the swing (a required time between the points).

The comprehensive evaluation display screen is a display screen including a radar chart indicating a result of evaluating the swing of the measurement subject P with a score for each evaluation item and a numerical value or the like indicating the score.

A graph related to the rotating speed of the lower back is displayed on the rotating speed display screen among the display screens.

Figure 11:
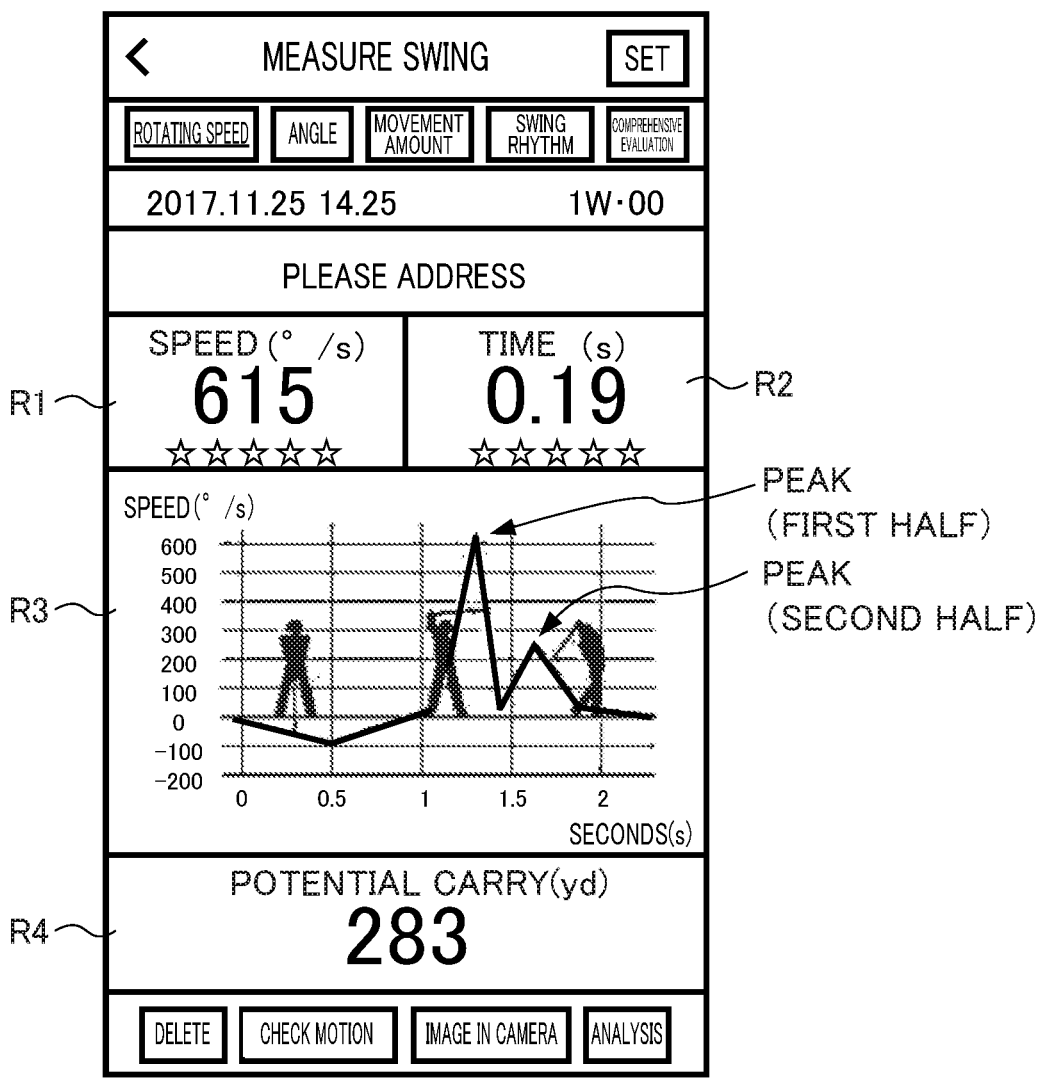
FIG. 11 is a schematic diagram illustrating an example of a rotating speed display screen.

FIG. 11 is a schematic diagram illustrating an example of the rotating speed display screen.

As illustrated in FIG. 11, the rotating speed display screen includes a region R1 for displaying the maximum value of the rotating speed (rotation angle speed) of the lower back, a region R2 for displaying the time to reach the highest rotating speed of the lower back from the top post, a region R3 for displaying the graph indicating the time change of the rotating speed of the lower back, and a region R4 for displaying a potential of a carry (potential carry) of the measurement subject P. The potential carry is calculated from a statistical method (a method of using an average value or the like) from carries of balls hit by a plurality of players whose swing data is close to the measurement subject. P.

As described above, there is a large difference in how to use the lower back between the advanced-level person and the beginner and the intermediate-level person in golf, and when the time change of the rotating speed of the lower back (graph) is shown, the waveform of the rotating speed of the lower back generally changes in the order of a mountain range type, a single-mountain type, and a double-mountain type with the improvement in the golf.

The double-mountain type is a type of swing in which the waveform of the rotating speed of the lower back is roughly clearly divided into mountains having a first half peak and a second half peak (two big mountains) and valleys therebetween, and is a type shown in the advanced-level persons such as the professional golfers. In other words, in the advanced-level persons, the rotation of the lower back is stopped once during the swing, and it is easy to increase the rotating speed of the lower back with this operation.

The single-mountain type is a type of swing in which the waveform of the rotating speed of the lower back roughly includes a mountain (one big mountain) having one peak. It means that in the case of the swing of the single-mountain type, the lower back is rotating, but the rotating speed is slow or that the lower back does not move efficiently, and as a result of performing the swing of the single-mountain type, it is difficult to smoothly perform a weight shift.

The mountain range type is a type of swing in which the waveform of the rotating speed of the lower back includes continuous wiggle mountains. It means that in the case of the swing of the mountain range type, the lower back does not rotate smoothly from the top to the impact, and when it snaps or sways, the swing of the mountain range type is shown.

The measurement subject P who has checked the rotating speed display screen can visually determine a swing type corresponding to his/her swing.

Further, in the present embodiment, when a predetermined manipulation (for example, a manipulation on an icon for displaying advice, or the like) is performed, the display control section 255 displays a screen. (hereinafter referred to as a "method presentation screen") for presenting description related to the types of swing and a method related to improvement of a swing according to a type as assistance information for the user. In the method display screen, the display control section 255 displays assistance information such as swing improvements and training for improving swing.

Figure 12:
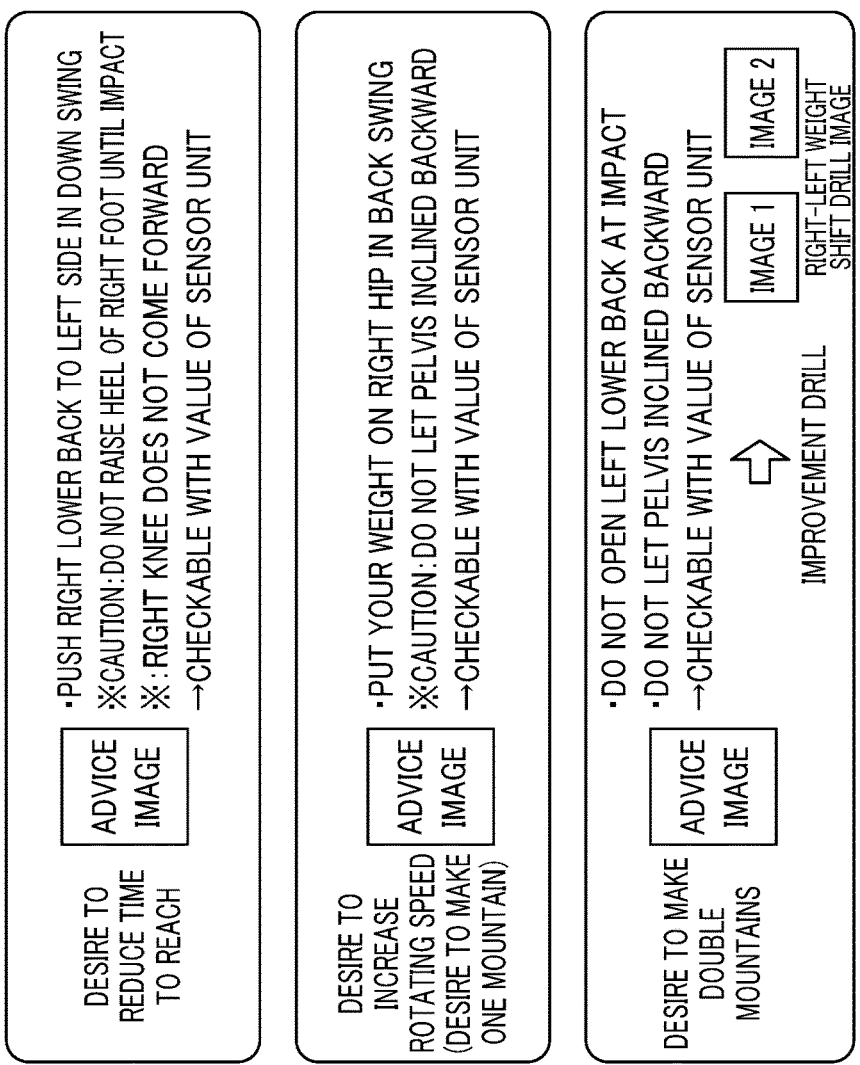
FIG. 12 is a schematic diagram illustrating an example of display content of a method presentation screen.

FIG. 12 is a schematic diagram illustrating an example of display content of the method presentation screen.

As illustrated in FIG. 12, the types (double-mountain type, single-mountain type, mountain range type) of the waveform of the rotating speed of the lower back of the measurement subject P, general evaluation results of the rotating speed of the lower back (the highest rotating speed, the time to reach the highest rotating speed of the lower back from the top post, and evaluation of ○, ×, and Δ related to the appearance of the two big mountains), and the assistance information of each type are displayed in the method presentation screen. For the swing of the double-mountain type, the assistance information for improving the swing is further displayed, and in the example of FIG. 12, information indicating that it is necessary to reduce the time to reach the highest rotating speed of the lower back from the top posture and an advice command for that is displayed. For the swing of the single-mountain type, the assistance information for making the swing of the double-mountain type and an advice command for that are displayed. For the swing of the single-mountain type, in the example of FIG. 12, an improvement drill for training the body is displayed together. Further, for the swing of the mountain range type, the assistance information for making the swing of the single-mountain type and advice information for that are displayed.

The content of the method presentation screen may be stored in the processing device 2 or may be a link to an external device where content can be downloaded from a predetermined content server or the like. Further, the content of the method presentation screen may be output by voice. Accordingly, the measurement subject P who is performing the swing can more easily understand the display content.

An indicator indicating the magnitude (movement degree) of the movement amount in the up-down direction, the right-left direction, and the front-rear direction between the points in the swing is displayed in the movement amount display screen.

Figure 13:
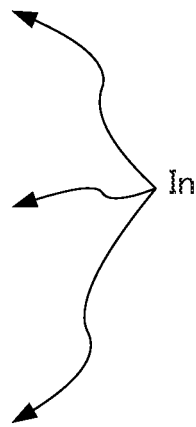
FIG. 13 is a schematic diagram illustrating an example of a movement amount display screen.

FIG. 13 is a schematic diagram illustrating an example of the movement amount display screen.

As illustrated in FIG. 13, in the movement amount display screen, degrees of right-left movement amount, up-down movement amount, and front-rear movement amount between the points (deviations for a reference swing) are indicated by a five-step indicator In for the swing of the measurement subject P.

FIG. 14 is a schematic diagram illustrating a relation between the indicator and the deviation.

In FIG. 14, x1 to x12, y1 to y12, and z1 to z12 indicate boundary values of the degree of movement amount.

As illustrated in FIG. 14, when the movement amount display screen is displayed, degrees of deviation which movement amounts of the lower back of respective points of address to top, top to front, front to finish in items of right and left, front and rear, and up and down have for the statistical data are classified. The indicator identified and displayed in the movement amount display screen is decided in accordance with a range of classified deviations (ranges corresponding to indicators A to E arranged from a plus side to a minus side). In FIG. 14, an indicator C in the middle corresponds to a range including an "average value," and a range of the indicator C is set to a value indicated by "deviation."

Further, as the statistical data to be used as the reference when the deviation of the measurement subject P is obtained, an average value of all the predetermined number or more of advanced-level persons may be used, or an average value of draw-type players, fade-type players, male professional golfers, female professional golfers, or each model according to a type of used club may be used. Further, his/her previous swing which the measurement subject. P determines as a good swing may be used as a reference.

The recording control section 256 stores the evaluation result data of the swing acquired by the swing evaluating section 254 in the evaluation result storage section 273 or the removable medium 231. Further, the recording control section 256 executes the storage of the evaluation result data when a manipulation to give an instruction to save the evaluation result data is performed.

Operation

Next, an operation of the analysis system S will be described.

FIG. 15 is a flowchart for describing a flow of an information detection process executed by the sensor unit 1.

The information detection process is started when the sensor unit 1 is activated.

In step S1, the communication control section 151 establishes a connection with the processing device 2 as a slave via the BLE.

In step S2, the calibration executing section 152 acquires the sensor information in the reference state in accordance with an instruction from the processing device 2 and executes the calibration in which the acquisition result is set as the reference value.

In step S3, the calibration executing section 152 gives a notification indicating the completion of the calibration to the processing device 2 via the BLE.

In step S4, the detection processing section 153 sequentially acquires various kinds of sensor information and starts a process of storing the acquired sensor information in the sensor information storage section 171 in association with an acquisition time.

In step S5, the detection processing section 153 analyzes the waveform of the acquired sensor information, detects a timing of the point of the address in the golf swing, and transmits the address detection signal to the processing device 2 via the BLE.

In step S6, the detection processing section 153 analyzes the waveform of the acquired sensor information, detects a timing of the point of the follow in the golf swing, and transmits the follow detection signal to processing device 2 by BLE.

In step S7, the detection processing section 153 analyzes the waveform of the acquired sensor information, and detects a timing of the respective points of the top, the down swing, and the impact in the golf swing.

In step S8, the sensor information transmission control section 154 converts the sensor information from the address to the follow into a preset sampling rate (for example, about 240 samples/sec) and transmits the sensor information to the processing device 2.

After step S8, the process proceeds to step S4.

Thereafter, when a manipulation to end the information detection process is input, the information detection process ends.

Next, an evaluation result display process executed by the processing device 2 will be described.

FIG. 16 is a flowchart for describing a flow of the evaluation result display process executed by the processing device 2.

The evaluation result display process is started when a manipulation to give an instruction to start the analysis result display process is performed through the input section 218.

In step S11, the communication control section 251 establishes a connection to the sensor unit 1 as a master via the BLE.

In step S12, the calibration managing section 252 instructs the sensor unit 1 to execute the calibration.

In step S13, the calibration managing section 252 receives a notification indicating that the execution of calibration is completed from the sensor unit 1 via the BLE.

In step S14, the display control section 255 displays a guide screen for urging the measurement subject P to address.

In step S15, the communication control section 251 receives the address detection signal from the sensor unit 1 via the BLE.

In step S16, the display control section 255 displays a guide screen for urging the measurement subject P to swing.

In step S17, the communication control section 251 receives the follow detection signal from the sensor unit 1 via the BLE.

In step S18, the display control section 255 displays a guide screen indicating that the swing is on analyzation.

In step S19, the sensor information acquiring section 253 acquires the sensor information of the preset sampling rate from the sensor unit 1 via the BLE.

In step S20, the display control section 255 displays the evaluation result display screen indicating the evaluation result of the swing of the measurement subject P on the basis of the evaluation result data acquired by the swing evaluating section 254. At this time, the display control section 255 displays the evaluation result display screen (see FIG. 10) corresponding to the button selected on the menu screen.

In step S21, the display control section 255 determines whether or not a manipulation to give an instruction to display the method presentation screen is performed.

When the manipulation to give an instruction to display the method presentation screen is performed, YES is determined in step S21, and the process proceeds to step S22.

On the other hand, when the manipulation to give an instruction to display the method presentation screen is not performed, NO is determined in step S21, and the process proceeds to step S23.

In step S22, the display control section 255 displays the method presentation screen.

In step S23, the recording control section 256 determines whether or not a manipulation to give an instruction to save the evaluation result data is performed.

When the manipulation to give an instruction to save the evaluation result data is not performed, NO is determined in step S23, and the process proceeds to step S14.

On the other hand, when the manipulation to give an instruction to save the evaluation result data is performed, YES is determined in step S23, and the process proceeds to step S24.

In step S24, the recording control section 256 stores the evaluation result data of the swing acquired by the swing evaluating section 254 in the evaluation result storage section 273 or the removable medium 231.

After step S24, the process proceeds to step S14.

Thereafter, when a manipulation to end the evaluation result display process is input, the evaluation result display process ends.

With this process, in the analysis system S, it is possible to analyze a three-dimensional motion of the body of the measurement subject P on the basis of the sensor information obtained by measuring the motion of the body of the measurement subject P and display the evaluation result display screen indicating the rotating speed of the lower back, the angle of the lower back, the movement amount of the lower back, the swing rhythm, the comprehensive evaluation, and the like.

In the evaluation result display screen, particularly, in the rotating speed display screen, the numerical values indicating the rotating speed (rotation angle speed) of the lower back and the time to reach the highest rotating speed of the lower back from the top posture, the graph indicating the time change of the rotating speed of the lower back, and the like are displayed.

Therefore, it is possible to display a type of how to use the lower back which is important in improvement in the golf, the type can be visually easily understood, and it is possible to accurately understand the degree of improvement of the swing of the measurement subject P.

Therefore, it is possible to more appropriately determine whether or not the motion of the measurement subject P is good on the basis of the sensor information (the angular speed or the like) in the lower back portion of the measurement subject P.

In the evaluation result display screen, particularly, in the movement amount display screen, an indicator or the like indicating the magnitude (movement degree) of the movement amount in the up-down direction, the right-left direction, and the front-rear direction between the points in the swing is displayed. The indicator in the movement amount display screen indicates the deviation of the swing of the measurement subject P for the statistical data based on the average of the swings of a predetermined number or more of advanced-level persons (male and female professional golfers or the like).

Therefore, the degree of deviation of the movement amount of the lower back of the respective points of address to top, top to front, and front to finish in the items of right and left, front and rear, and up and down for the difference between the swing of the measurement subject P and the swing of the advanced-level person can be displayed to be visually easily understood.

Therefore, it is possible to more appropriately evaluate whether or not the motion of the measurement subject P is good on the basis of the measurement, value of the sensor installed on the lower back portion of the measurement subject P.

As described above, according to the analysis system S of the present embodiment, it is possible to more appropriately evaluate whether or not the motion of the measurement subject P is good.

When it is evaluated whether or not the motion of the measurement subject. P is good, a difference between the lower back portion movement amount of the measurement subject P and a predetermined value such as the statistical data used as the reference such as the average value of the lower back portion movement amounts of the advanced-level persons may be compared, and the motion of the measurement subject P may be evaluated to be higher as the difference is smaller.

First Modified Example

In the above embodiment, when the evaluation result of the swing of the measurement subject P is displayed by the evaluation result display screen, an animation indicating the features of the swing of the measurement subject P may be displayed.

For example, when a reverse pivot or a sway occurs in the swing of the measurement subject P, an animation of clearly performing a swing indicating a reverse pivot or a sway may be displayed.

Accordingly, it is possible to clearly display the features in the swing of the measurement subject P.

Further, when the animation is displayed, the features in the swing of the measurement subject P may be displayed in an exaggerated manner.

Further, in addition to the animation, numerical values indicating the movement amount and the like of the lower back portion may be displayed.

Second Modified Example

In the above-mentioned embodiment, the swing of the measurement subject. P may be measured while capturing a moving image of the swing using an imaging device such as a digital camera further, and in the evaluation result display process, the moving image of the swing may be displayed together with the evaluation result data.

Accordingly, since it is possible to display the numerical values and the graph indicating the features of the swing of the measurement subject P together with the moving image of the swing, it is possible to display the evaluation result of the swing of the measurement subject P in a more easily understandable form.

The analysis system S configured as described above includes the sensor unit 1 and the processing device 2. The sensor unit 1 is installed on the lower back portion of the user. The processing device 2 includes the swing evaluating section 254.

The swing evaluating section 254 extracts a first peak waveform and a second peak waveform in an output result of the angular speed measured by the sensor installed on the lower back portion of the user.

The swing evaluating section 254 evaluates the motion of the user on the basis of an extraction result.

Accordingly, it is possible to evaluate the motion of the user focusing on the states of the first peak waveform and the second peak waveform in the waveform of the angular speed detected in the lower back portion of the user.

Therefore, it is possible to more appropriately determine whether or not the motion of the user is good in the electronic device that detects the motion of the user by the sensor installed on the lower back portion.

The swing evaluating section 254 evaluates the motion of the user on the basis of the shapes of the first peak waveform and the second peak waveform.

Accordingly, it is possible to determine whether or not the motion of the user is good by reflecting whether or not the specific shapes of the first peak waveform and the second peak waveform are appropriate.

The swing evaluating section 254 evaluates the motion of the user on the basis of a relation of the waveform shapes between the first peak waveform and the second peak waveform.

Accordingly, it is possible to determine whether or not the motion of the user is good by reflecting other conditions in addition to whether or not the first peak waveform and the second peak waveform are appropriate, for example, whether or not an appropriate valley at which the angular speed is substantially zero appears between the first peak waveform and the second peak waveform.

The swing evaluating section 254 determines whether or not the first peak waveform and the second peak waveform are extracted and evaluates the motion of the user on the basis of a determination result thereof.

Accordingly, it is possible to determine whether or not it is the waveform of the angular speed shown in the beginner and the intermediate-level person and evaluate the motion of the user.

The processing device 2 includes the display control section 255.

The display control section 255 notifies of the evaluation result of the evaluated motion of the user.

Accordingly, it is possible to explicitly notify the user of the evaluation result of the motion focused on the states of the first peak waveform and the second peak waveform.

The display control section 255 notifies of the advice information on the basis of the evaluation result of the evaluated motion of the user.

Accordingly, it is possible to present the advice information for improving the motion focused on the states of the first peak waveform and the second peak waveform to the user.

It should be noted that the present invention is not to be limited to the aforementioned embodiments, and that modifications, improvements, etc. within a scope that can achieve the objects of the present invention are also included in the present invention.

For example, in the above embodiment, the moving image of the swing may be captured using the imaging function (the digital camera or the like) installed in the processing device 2, and the moving image of the swing may be displayed together with the evaluation result data in the evaluation result display process.

In the above embodiment, the sensor unit 1 detects a timing of a predetermined feature point in a golf swing, but the present invention is not limited thereto. In other words, the processing device 2 may detect a timing of a predetermined feature point in a golf swing on the basis of the sensor information acquired from the sensor unit 1.

In the above embodiment, the analysis system S is constituted by two devices, that is, the sensor unit 1 and processing device 2, but the present invention is not limited thereto. For example, the analysis system S may be configured as a device in which the sensor unit 1 and the processing device 2 are integrated such as a smartphone or the like having the functions of both the sensor unit 1 and the processing device 2.

In the above embodiment, when a timing of a predetermined feature point in a golf swing is detected on the basis of the sensor information, it is possible to analyze time-series data in a chronological order and identify feature points or analyze a time series retroactively from a timing clearly identifiable as a feature point and identify other feature points.

Accordingly, it is possible to more reliably detect timing of a predetermined feature point in a golf swing.

The description of the above embodiment has proceeded with the example in which the sensor unit 1 is installed on the measurement subject P who performs the golf swing, and the analysis system S is used for analysis of the golf swing, but the present invention is not limited thereto. In other words, the analysis system S according to the present invention can be used for various kinds of sports or the like in which a player serving as a subject can be photographed at a fixed position of an angle of view such as baseball, tennis, athletics, and the like. For example, the analysis system S according to the present invention can be used for a batter who swings at a baseball bat, a pitcher who throws at a mound, a server in tennis, a sprinter who is photographed by a camera moving in parallel, and the like.

Further, in the above embodiment, the processing device 2 to which the present invention is applied has been described using a smartphone as an example, but the present invention is not particularly limited thereto.

For example, the present invention can be generally applied to electronic devices with image processing functions. Specifically, for example, the present, invention can be applied to laptop personal computers, printers, television receivers, video cameras, portable navigation devices, mobile phones, portable game machines, and the like.

The processing sequence described above can be executed by hardware, and can also be executed by software.

In other words, the hardware configuration of FIGS. 5 and 7 is merely an illustrative example, and the present invention is not particularly limited thereto. More specifically, the types of functional blocks employed to realize the above-described functions are not particularly limited to the examples shown in FIGS. 5 and 7, so long as the analysis system S can be provided with the functions enabling the aforementioned processing sequence to be executed in its entirety.

A single functional block may be configured by a single piece of hardware, a single installation of software, or a combination thereof.

The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific integrated Circuit) or FPGA (Field-Programmable Gate Array).

In the case of having the series of processing executed by software, the program constituting this software is installed from a network or recording medium to a computer or the like.

The computer may be a computer equipped with dedicated hardware. In addition, the computer may be a computer capable of executing various functions, e.g., a general purpose personal computer, by installing various programs.

The storage medium containing such a program can not only be constituted by the removable medium 231 of FIG. 4 distributed separately from the device main body for supplying the program to a user, but also can be constituted by a storage medium or the like supplied to the user in a state incorporated in the device main body in advance. The removable medium 231 is composed of, for example, a magnetic disk (including a floppy disk), an optical disk, a magnetic optical disk, or the like. The optical disk is composed of, for example, a CD-ROM (Compact Disk-Read Only Memory), DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 112 and 212 of FIGS. 3 and 4 in which the program is recorded or a hard disk, etc. included in the storage unit 119 and 220 of FIGS. 3 and 4.

It should be noted that, in the present specification, the steps defining the program recorded in the storage medium include not only the processing executed in a time series following this order, but also processing executed in parallel or individually, which is not necessarily executed in a time series.

Further, in the present specification, the terminology of the system means an entire apparatus including a plurality of apparatuses and a plurality of units.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. A device for evaluating motion of a user, the device using angular speed data outputted from a mountable sensor, the sensor being mounted on a buttock of the user, the device comprising:
   a memory; and
   a processor,
   wherein the processor executes a program stored in the memory to perform operations comprising:
   acquiring a waveform of a rotating speed of a lower back of the user from time-series data indicating a time change of the rotating speed of the lower back of the user which is the angular speed data measured by the sensor;
   determining whether the acquired waveform corresponds to one of a plurality of waveform types, the plurality of waveform types including: (i) a double-mountain type including a first peak and a second peak, (ii) a single-mountain type including one peak, and (iii) a mountain range type including continuous wiggle mountains;
   outputting evaluation information which is information in relation to evaluation of the rotating speed of the lower back of the user according to a waveform type determined from among the plurality of waveform types.

2. The device according to claim 1, wherein the processor further performs operations comprising:
   in a case in which the waveform is determined to be of the double-mountain type, outputting the evaluation information in relation to appearances of a waveform of the first peak and a waveform of the second peak.

3. The device according to claim 1, wherein the processor further performs operations comprising:
   in a case in which the waveform is determined to be of the single-mountain type, outputting motion information for the waveform to become the double-mountain type.

4. The device according to claim 3, wherein the device further comprises a communication unit that performs communication with the sensor, and the processor outputs the motion information acquired by the communication unit from the sensor.

5. The device according to claim 1, wherein the processor further performs operations comprising:
   in a case in which the waveform is determined to be of the mountain range type, outputting motion information for the waveform to become the single-mountain type.

6. The device according to claim 5, wherein the device further comprises a communication unit that performs communication with the sensor, and the processor outputs the motion information acquired by the communication unit from the sensor.

7. The device according to claim 1, wherein the processor outputs advice information as the evaluation information.

8. A method for evaluating motion of a user, using angular speed data outputted from a sensor mounted on a buttock of the user, the method comprising:
   acquiring a waveform of a rotating speed of a lower back of the user from time-series data indicating a time change of the rotating speed of the lower back of the user which is the angular speed data measured by the sensor;
   determining whether the acquired waveform corresponds to one of a plurality of waveform types, the plurality of waveform types including: (i) a double-mountain type including a first peak and a second peak, (ii) a single-mountain type including one peak, and (iii) a mountain range type including continuous wiggle mountains;
   outputting evaluation information which is information in relation to evaluation of the rotating speed of the lower back of the user according to a waveform type determined from among the plurality of waveform types.

9. A non-transitory computer-readable storage medium having stored thereon a program which, when executed by a computer connected to a sensor mounted on a buttock of a user, causes the computer to perform operations comprising:

acquiring a waveform of a rotating speed of a lower back of the user from time-series data indicating a time change of the rotating speed of the lower back of the user which is angular speed data measured by the sensor;

determining whether the acquired waveform corresponds to one of a plurality of waveform types, the plurality of waveform types including: (i) a double-mountain type including a first peak and a second peak, (ii) a single-mountain type including one peak, and (iii) a mountain range type including continuous wiggle mountains;

outputting evaluation information which is information in relation to evaluation of the rotating speed of the lower back of the user according to a waveform type determined from among the plurality of waveform types.

\* \* \* \* \*